June 21, 1949. K. B. HUME 2,474,149
APPARATUS FOR CUTTING CURVED PLATES
USED IN SPHERICAL TANKS
Filed Sept. 19, 1944 6 Sheets-Sheet 1
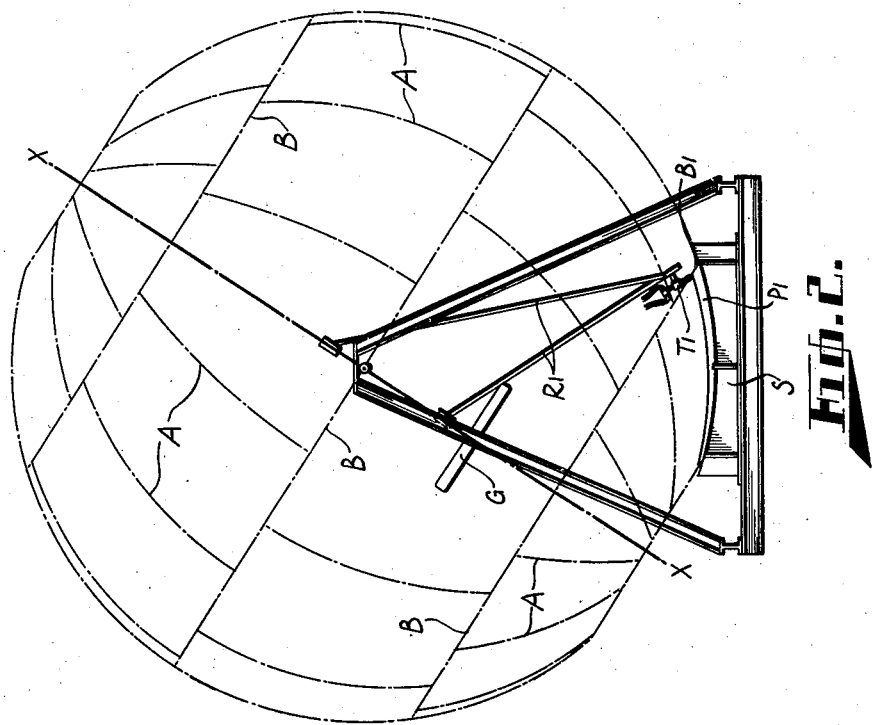
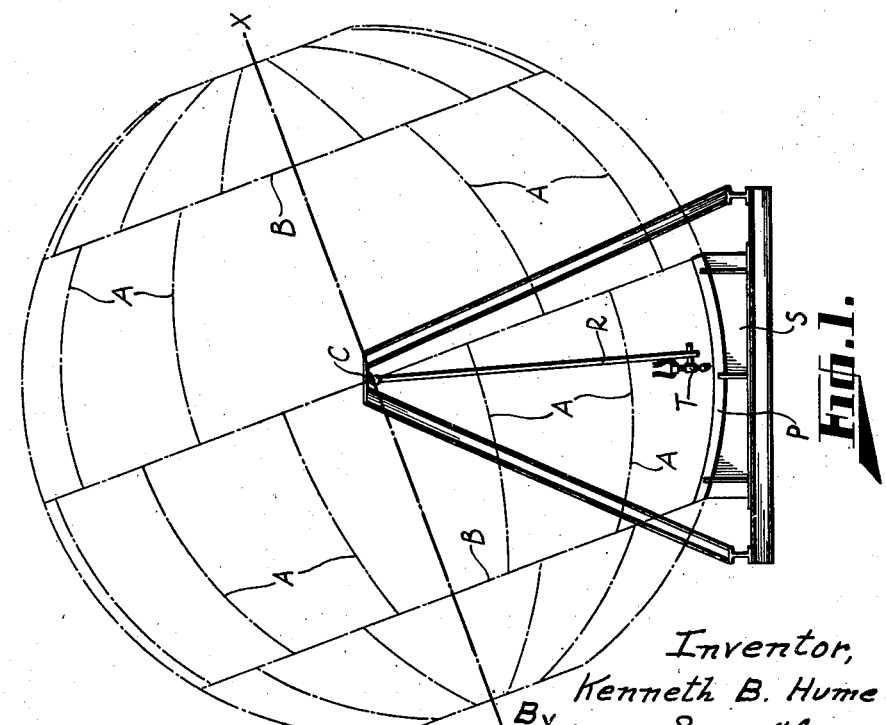
Inventor,
Kenneth B. Hume

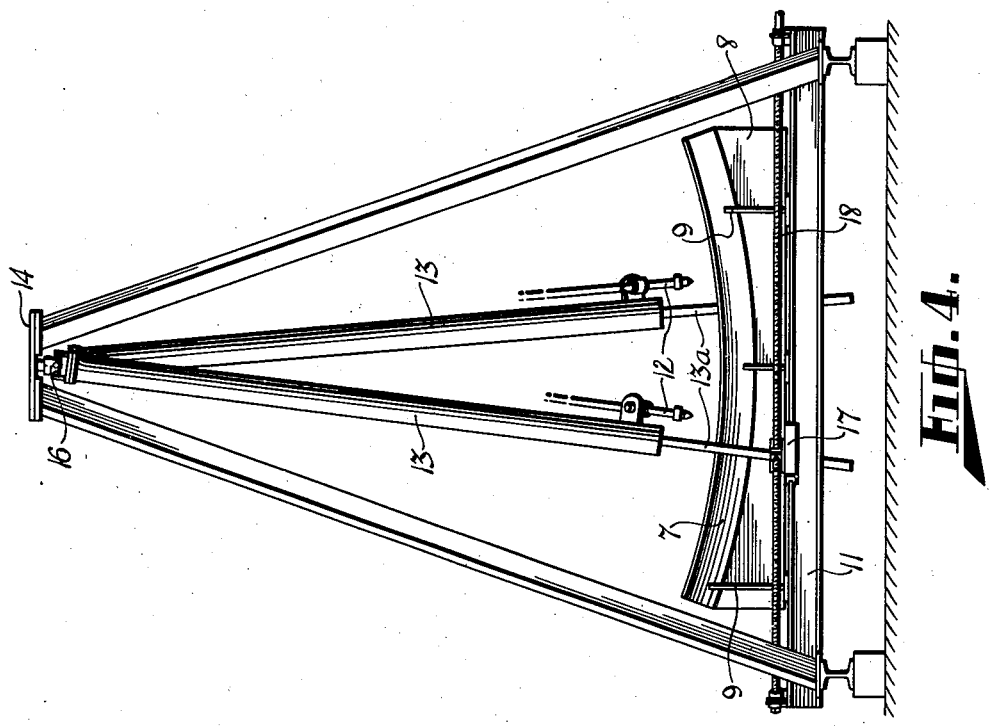
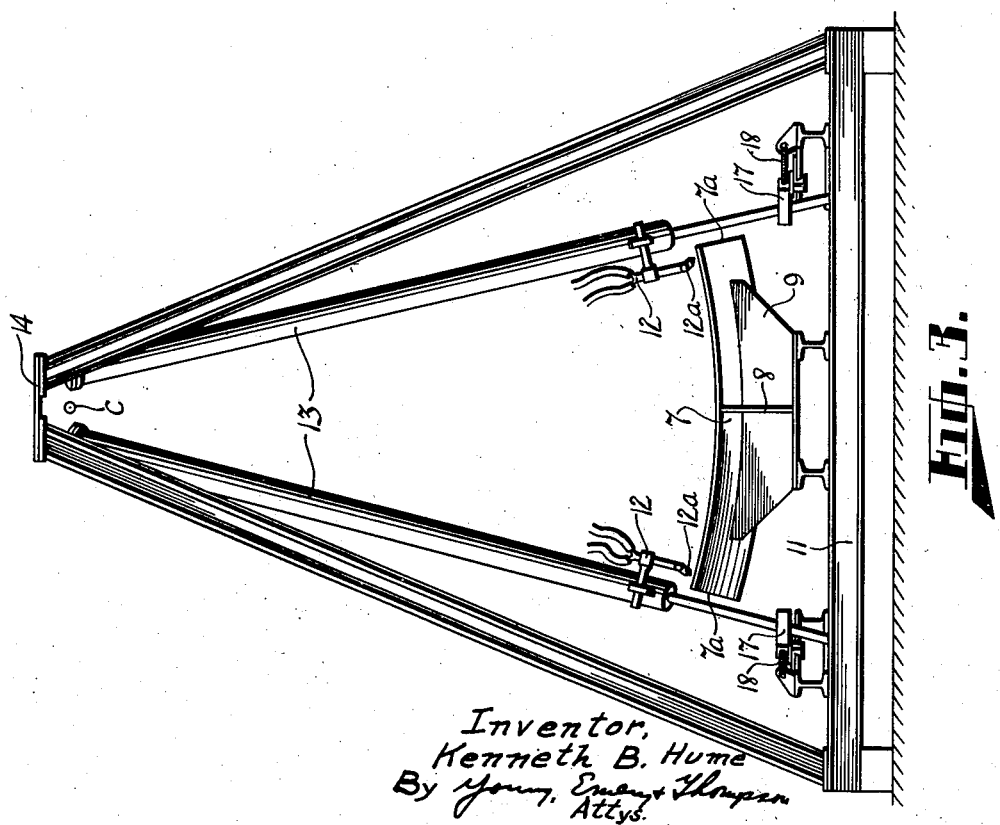

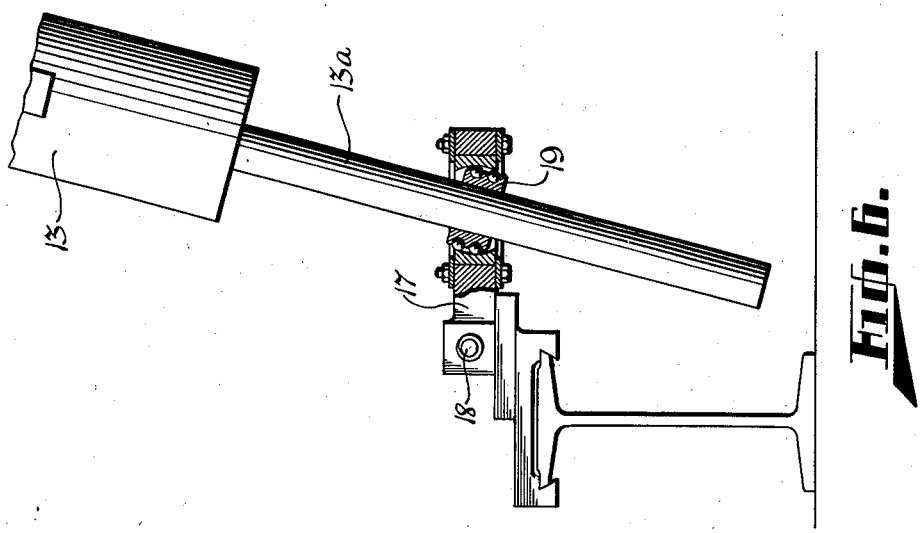
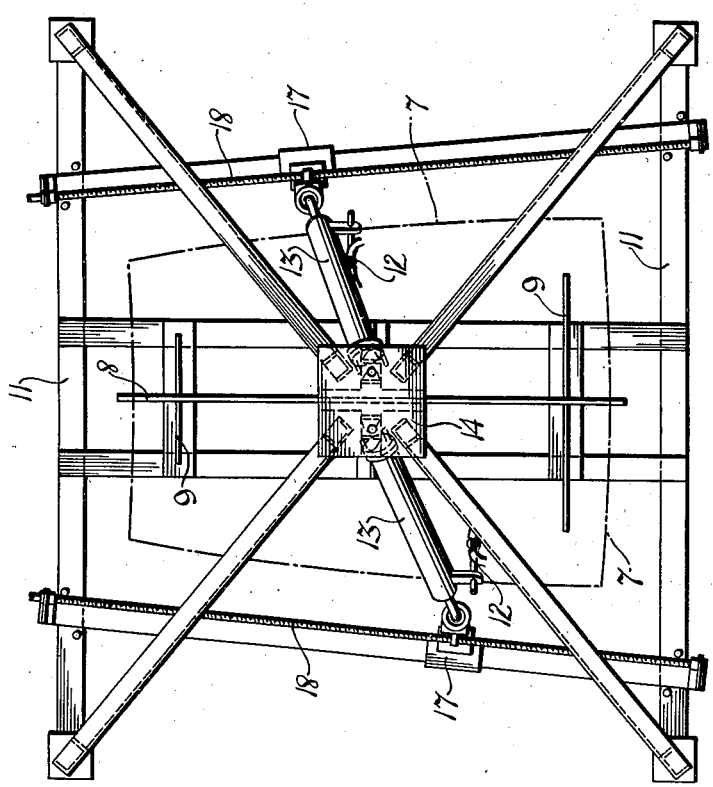

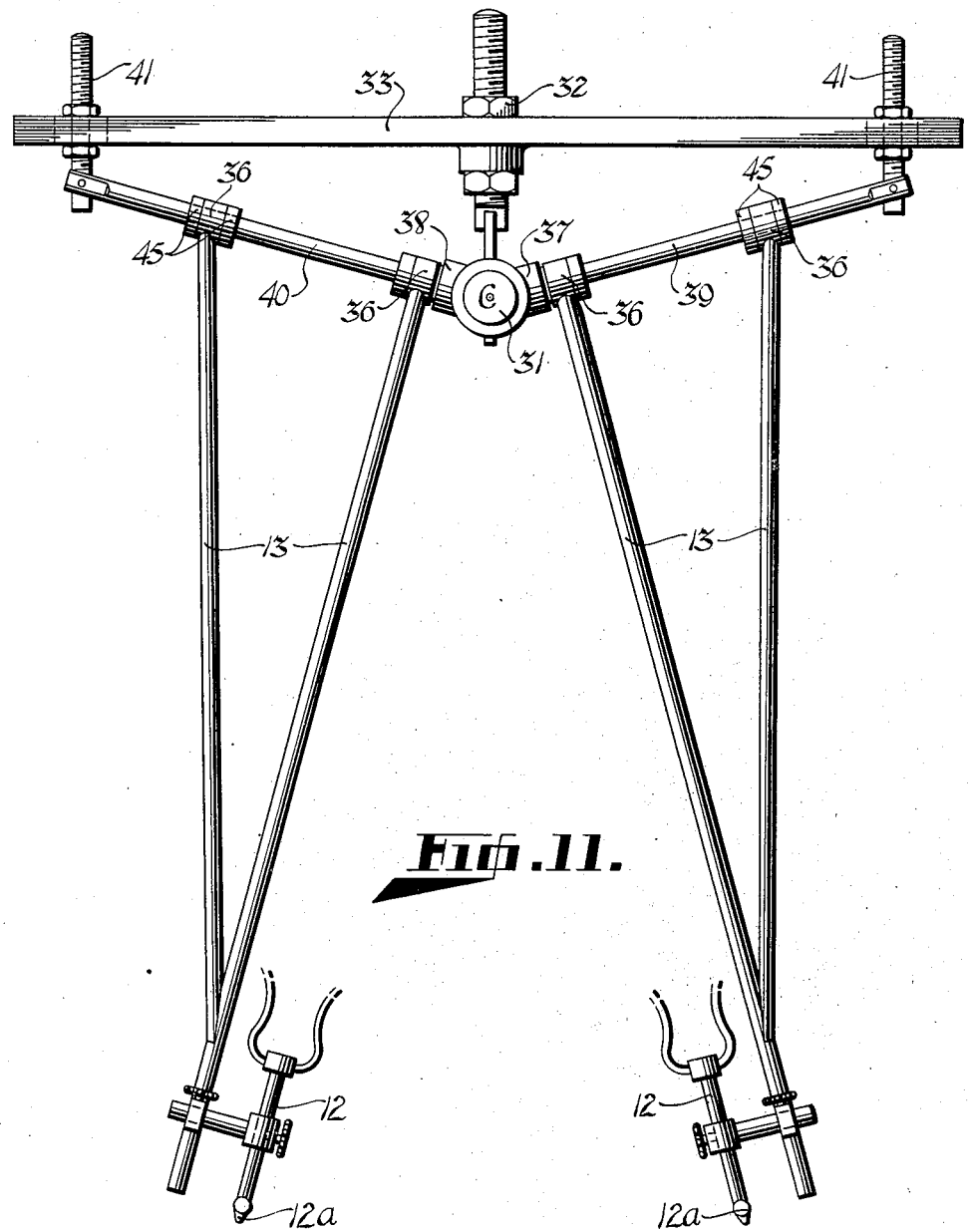

Patented June 21, 1949

2,474,149

UNITED STATES PATENT OFFICE 2,474,149

APPARATUS FOR CUTTING CURVED PLATES USED IN SPHERICAL TANKS

Kenneth Bourne Hume, Kew, Melbourne, Victoria, Australia

Application September 19, 1944, Serial No. 554,846
In Australia September 29, 1943

2 Claims. (Cl. 266—23)

This invention relates to the formation of metal structures of spherical, spheroidal, dome-like and other such shapes, in which the structures are built up from a series of curved segmental plates which are welded or otherwise united. Such structures have come into vogue in comparatively recent years for the bulk storage of a wide range of commodities.

It will be apparent that in order that the final structure is true to shape, extreme accuracy is essential in the formation or shaping of the segmental plates. According to the usual method, the metal plates are marked with the aid of a template and cut along the marked edges by means of a hand manipulated oxy-acetylene torch or the like. Such method is relatively slow and does not allow of the high degree of accuracy which is desired, with the result that difficulties and additional costs have been experienced when assembling or erecting the plates due to the fact that they do not fit closely together.

The present invention provides what is believed to be a new method of producing such curved segmental plates whereby a very high degree of accuracy in final shape is attained.

Another object of the invention is to provide simple and effective apparatus whereby the method may be carried into effect in a most economical and expeditious manner.

For the purpose of more clearly explaining the invention, it will be assumed in the following description that it is desired to produce curved segmental plates for the erection of a spherical, or part spherical, structure.

Metal plate of the requisite thickness is first cut in the flat roughly to the desired shape, e. g. trapezoidal and having desirable surplus along its edges which surplus is destined to be removed as hereinafter described. The plate is then pressed, as by a hydraulic press so that it receives a curvature corresponding to the part of the structure which it is to constitute.

The removal of the surplus or marginal portions of the curved plate constitutes an important feature of the invention. It is preferably effected by a torch cutting operation which is performed in such a manner as to insure that the edges are cut to precision so that the plate will make a close and accurate joint around all of its edges with other plates which have been similarly formed or shaped.

The invention is particularly applicable where the cut edges of the plate sections extending in one direction would, if continued, all intersect at two opposite polar points of the sphere in the manner of lines of longitude on a spherical planet. These edges and the cuts to form them may thus be described as "great circle" edges and cuts.

The plate edges extending in the direction at right angles from the foregoing form a series of circles the planes of which are all parallel and intersect at right angles the axis of the sphere through the above-mentioned polar points. This series of parallel circles is analagous to circles of latitude on a spherical planet and the edges and the cuts to form them may therefore be described as "parallel or lesser circle" edges and cuts.

Thus there are two general types of cuts to be made. Points axial to one system form lines in quadrature to points axial to the other system, and these axial lines have a common point of intersection at the centre of the sphere of which the plate being cut forms a segement.

The invention therefore involves a method of forming curved segmental plates suitable for the erection of spherical, spheroidal, dome-like and similar structures wherein a metal plate fashioned to the desired curvature and of slightly greater overall dimensions than finally required has its surplus marginal portions removed by a cutting element which is caused to swing in a plane path about a point which is coincident, or substantially coincident, with the centre of the circle coinciding with the desired edge of the plate to be formed.

In the case of "great circle" cuts, the cutting element will be caused to swing in a plane path about a point which is coincident, or substantially coincident, with the geometrical centre of the structure of which the plate is to form a part.

In the case of "lesser or parallel" cuts, the cutting element will swing in a plane path about the polar axis of the structure.

Referring to the drawings which form part of this specification:

Figure 1 is a diagram of a substantially spherical object made up of plate sections in accordance with the invention, and indicating how great circle cuts may be formed.

Figure 2 is a similar diagram indicating how parallel or lesser circle cuts may be formed.

Figure 3 is an end elevation of one form of apparatus according to the invention adapted for great circle cutting.

Figure 4 is a side elevation.

Figure 5 is a plan.

Figure 6 is an enlarged, part sectional, detail of certain parts seen in Figures 3, 4 and 5.

Figure 11 is a side elevation of Figure 9.

Figure 7:
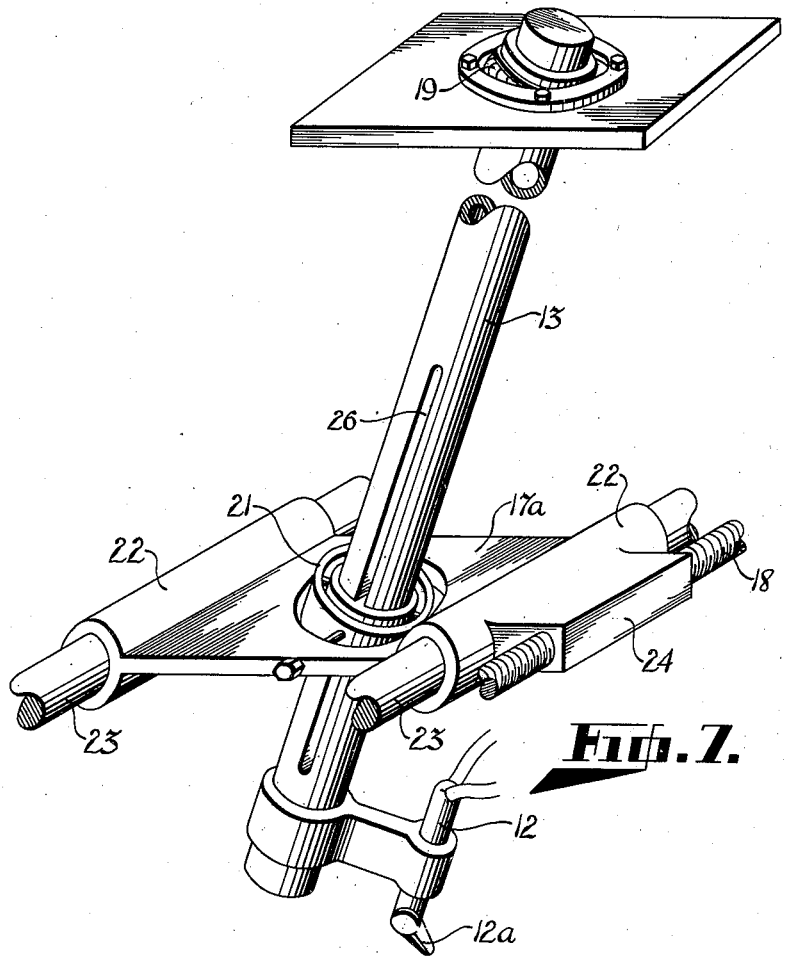
Figure 7 is a perspective showing a modification of means for supporting and guiding a cutting arm.

Referring firstly to Figures 1 and 2, A indicates the great circle edges, and B the lesser circle edges, of segmental plates produced in accordance with the invention and assembled to form a spherical structure the polar axis of which is designated X—X. In Figure 1 a segmental plate P is shown in unbroken lines at the lower part of the sphere resting upon a support S. To form a great circle cut for the edge A of this plate an arm or radius rod R carrying a cutting torch T at its outer end would be swung in a plane path about the geometrical centre C of the sphere.

In Figure 2, it is assumed that the sphere has been partially revolved about its polar axis X—X which has also been tilted in anti-clockwise direction towards a more upright position than in Figure 1, the plate P being in process of having one edge B cut along a lesser or parallel circle. This is shown to be effected by a torch T₁ mounted at the joined lower end of two arms R₁ which are assumed to be capable of turning about the polar axis X—X.

Having described the fundamental principle of the invention, reference will now be made to one practical adaptation as illustrated in Figures 3 to 6, in which a metal plate or blank 7 which has been given the requisite curvature by a hydraulic press or the equivalent, is temporarily secured concave side uppermost, upon a support comprising a central longitudinal web 8 and cross webs 9 upstanding from a base 11. The plate is shown as of trapezoidal form and of slightly greater overall dimensions than actually required so that it has marginal edge portions 7a which are surplus as will appear from Figure 3.

Removal of these surplus portions is preferably performed by oxy-acetylene or other suitable torches 12 carried by cutting arms or radius rods 13 which may be suspended from an overhead support 14, the points of suspension being equidistant or as near equidistant as possible, from all points of the surface of the plate along the line of the cut which is to be made.

In cases where two torches and arms or radius rods are employed to remove surplus from opposite sides of a plate simultaneously, as shown in Figures 3, 4 and 5, the points about which the arms swing need not actually coincide with the centre of the circle to be cut but should be located axially to that circle. The more important factor is that the nozzle or tip of each torch should, in the case of a great circle cut, move in a plane path about the geometrical centre of the plate sphere or as near that centre as possible.

Each cutting arm may be inclined downwardly and outwardly at an appropriate angle from the vertical, and is adapted to be guided so that it moves with a swinging motion about its point of support in a predetermined plane.

According to Figures 3, 4 and 6, each arm 13 is connected to its support by a universal joint 16 while the guiding means comprises a slide block 17 traversable lengthwise by a feed screw 18 extending parallel with the predetermined line of the cut, the slide block accommodating a self-aligning ball or roller bearing 19 (Figure 6) through which the lower end portion 13a of the arm may slide.

Figure 8:
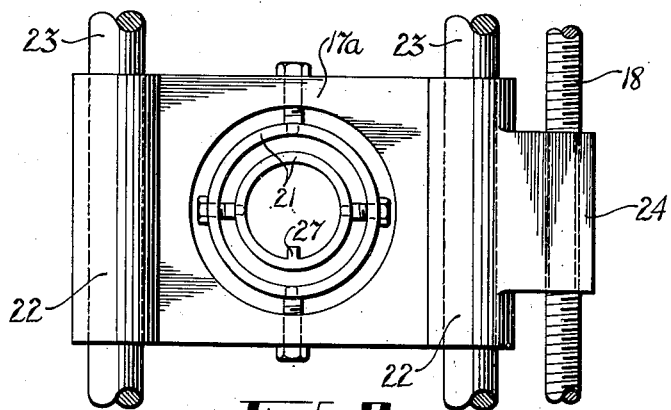
Figure 8 is a plan of the lower part of Figure 7 omitting the cutting arm.

According to the modification illustrated in Figures 7 and 8, the upper end of the arm 13 is supported by a self-aligning bearing 19, while the lower end of the arm extends through a gimbal device 21 carried by a slide block 17a having cylindrical bosses 22 for guide rods 23, and a lug 24 to receive the traversing screw 18. In order to maintain torsional rigidity, the arm 13 may have a longitudinal slot or keyway 26 to receive a key 27 projecting from the gimbal ring.

The oxy-acetylene torches or equivalent cutting devices should be mounted upon the arms 13 so that their positions may be adjusted lengthwise and circumferentially, while the nozzle 12a of each torch should also be adjustable so that a straight cut or any degree of bevelled cut may be effected.

In operation, each torch and feed screw are put into action and the respective arm 13 is caused to swing in a linear path so that the torch follows the contour of the concave surface of the plate in a straight path and thus progressively cuts off the surplus edge portion of the plate, leaving an accurate cut edge, which in the instant case will be a part of a great circle.

The torch nozzle may be directed at a suitable downwardly and inwardly inclined attitude whereby the cut edge of the plate will have a desirable bevel or chamfer so that when assembled with another similarly shaped and formed plate, a channel or cavity will be provided between the adjacent edges for the reception of welding metal deposited from a fusible electrode.

As shown in Figures 3, 4 and 5, a cutting arm, torch, feed screw and associated parts as before mentioned may be arranged at each side of the apparatus so that opposite edges of a plate may be cut simultaneously.

It will be understood that the apparatus may be adjusted to cut segments of given curvature of various sizes i. e. of different widths, tapers or lengths. In the case of varying widths, the angle of each arm 13 from the vertical would be decreased or increased, as the case may be, and the position of the slide and the feed screw adjusted accordingly.

Simple adjustments may also be made to enable segmental plates for any given diameter sphere to be cut. In such cases the effective length of the arm 13 can be varied by lengthwise adjustment of the torch thereon.

It is also to be understood that although it may be preferable for the plate 7 to be mounted in a horizontal plane with its concave surface uppermost and the arms 13 to be suspended from an overhead support as illustrated, this is not essential.

Still further, it will be understood that where a considerable number of identically shaped and sized plates is desired, the first of such plates may be produced as before described and may then serve as a template for the formation of the remaining plates.

Figure 9:
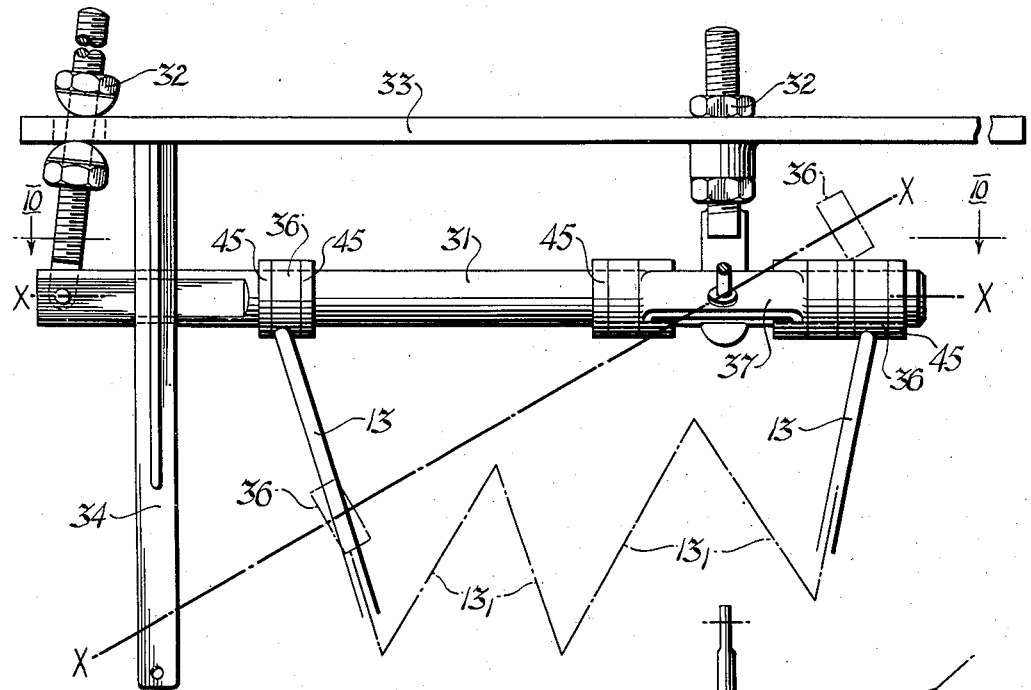
Figure 9 is a front elevation of another form of apparatus according to the invention by which both great circle and lesser circle cuts may be performed.
Figure 10:
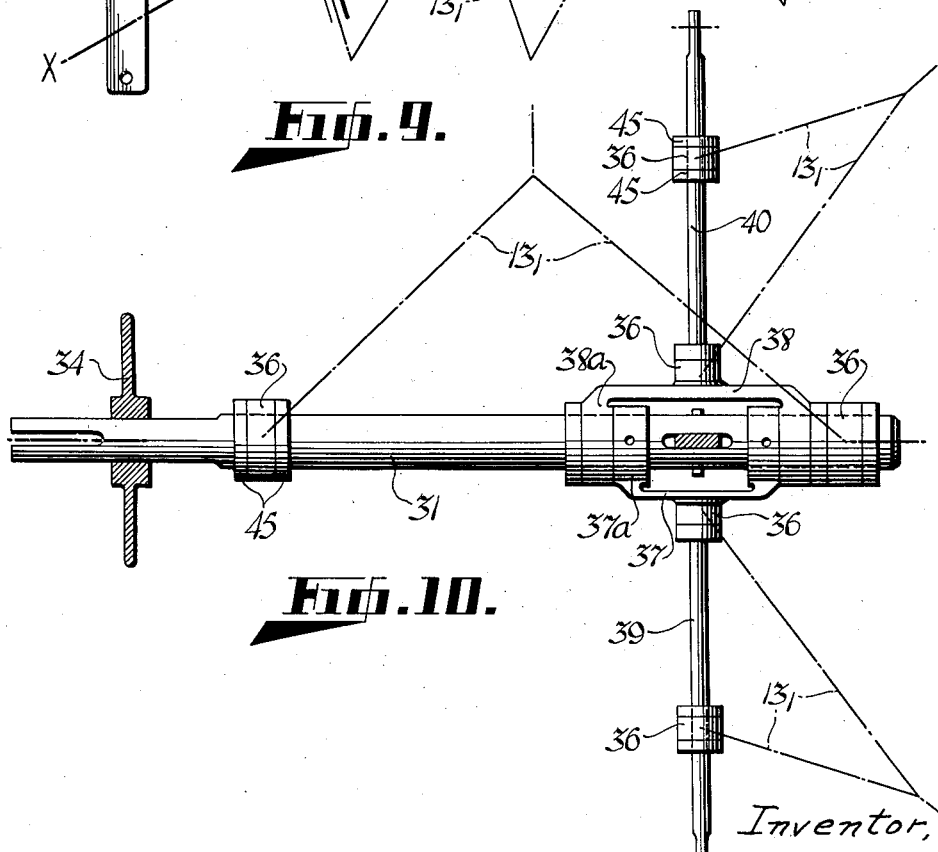
Figure 10 is a plan view on line 10—10 of Figure 9.

Referring now to Figures 9, 10 and 11, the shaft 31, adjustably supported, as by screw and nut devices 32 or their equivalents from an overhead girder 33 or the like, may be said to provide a polar axis X—X as in Figures 1 and 2. One of the infinitely alternative positions of this shaft is indicated by broken lines in Figure 9, and guides 34 are shown for maintaining the shaft in a given vertical plane.

A pair of cutting arms 13 are shown terminating at their upper ends in bearing sleeves 36 which rotatably encircle shaft 31 at optionally spaced points along the length thereof between collars 45. These arms extend downwardly as indicated by the fore-shortened broken lines 13, and are joined or inter-connected at their lower ends and support a cutting torch as before mentioned. It will be appreciated that such an arrangement is suitable for making lesser or parallel circle cuts.

It is not essential that the cutting arms 13 be of duplex form. A single arm may be employed, but in that event an appropriate guide device should be provided to ensure that the torch will swing along a predetermined plane path. Such a guide device may be of a form similar to that associated with the arms of Figures 3 to 5 provided that the sliding surfaces of that part of the arm associated with the guide are in a plane normal to the polar axis of the sphere. For simplicity, however, it would be sufficient to employ a ring or curved bar guide G (see Figure 2) disposed concentrically about axis X—X and against which the single arm 13 (or $R_1$ of Figure 2) may slide during its swinging motion about axis X—X.

Shaft 31 may be encircled by the forked ends 37a, 38a of yoke members 37, 38 of companion shafts 39, 40 which outstand at right angles in opposite directions to shaft 31. The shafts 39, 40 may be angularly adjusted in relation to shaft 31 and maintained in desired positions by screw and nut devices 41, but at all positions the centre lines of shafts 39, 40 intersect the axis X—X of shaft 31 at a common point C which corresponds with the geometrical centre of the sphere formed by the plates.

Dual arms 13 carrying torches 12 at their lower ends may have bearing sleeves 36 at their upper ends turnable about the respective shafts 39, 40 so that by swinging movements of the arms each torch 12 will move in a plane path about centre C and thus describe part of a great circle. As before mentioned the arms 13 may be of single formation and have appropriate guide means to ensure that they will swing along a predetermined plane path.

It is to be understood that any suitable means, may be employed to swing the arms during their working stroke. They may, for instance, have cables attached to them and extending around pulleys or winch drums. Or, the lower ends of the arms may have small wheels or rollers driven by fractional horsepower motors and adapted to track along the curved plates. Other means of operating the arms will be well within the scope of persons versed in the art.

It will also be understood that the invention may be applied to form die cutters of part spherical form as may be used for imparting the requisite curvature to the segmental plates. In such event a cutting arm with torch as aforesaid may be suspended from the geometrical centre point of a desired sphere and be used with or without automatic driving and/or guiding means for the purpose of cutting a series of side by side or intersecting plates disposed in a vertical plane.

Having now described by invention what I claim as new and desire to secure by Letters Patent is:

1. Apparatus for forming curved segmental plates for the formation of spherical, dome-shaped and similar structures comprising a support, a main shaft, a plurality of means for carrying said shaft in spaced relation to said support, said means being spaced axially of the shaft and including adjustable elements for independently varying the spacing between the portions of the shaft carried thereby and the support, cutter arms mounted on said shaft for swinging movement about the same, a pair of brackets swingably mounted on said shaft adjacent one of said shaft-carrying means, a pair of secondary shafts each perpendicular to the main shaft and having one end fixed in one of the brackets, so that the axes of the secondary shafts always intersect each other at the axis of the main shaft, means at the remote ends of the secondary shafts for varying the spacing thereof from the support, and a cutter arm mounted on each secondary shaft for swinging movement about the same.

2. Apparatus for forming curved segmental plates for the formation of spherical, dome-shaped and similar structures comprising a support, a main shaft beneath said support, a hanger carrying said shaft at one end thereof, a hanger carrying the shaft adjacent to, but spaced from the other end thereof, means for adjustably connecting the hangers to said support to vary the spacing of the shaft beneath the support and the angularity of the axis of the shaft relative to the support, cutter arms mounted on said shaft for swinging movement about the same, a pair of brackets swingably mounted on said shaft adjacent one of said shaft-carrying means, a pair of secondary shafts each perpendicular to the main shaft and having one end fixed in one of the brackets, so that the axes of the secondary shafts always intersect each other at the axis of the main shaft, means at the remote ends of the secondary shafts for varying the spacing thereof from the support, and a cutter arm mounted on each secondary shaft for swinging movement about the same.

KENNETH BOURNE HUME.

REFERENCES CITED

The following references are of record in the file of this patent:

UNITED STATES PATENTS

| Number | Name | Date |
| --- | --- | --- |
| 1,459,369 | Hill | June 19, 1923 |
| 1,977,135 | Lockhart | Oct. 16, 1934 |
| 2,182,707 | Shipman | Dec. 5, 1939 |
| 2,190,360 | Howard | Feb. 13, 1940 |
| 2,276,755 | Anderson | Mar. 17, 1942 |

FOREIGN PATENTS

| Number | Country | Date |
| --- | --- | --- |
| 676,607 | Germany | 1939 |
| 697,590 | Germany | 1940 |